US011450327B2

(12) United States Patent
Chu

(10) Patent No.: US 11,450,327 B2
(45) Date of Patent: Sep. 20, 2022

(54) SYSTEMS AND METHODS FOR IMPROVED ACCURACY OF BULLYING OR ALTERCATION DETECTION OR IDENTIFICATION OF EXCESSIVE MACHINE NOISE

(71) Applicant: Soter Technologies, LLC, Ronkonkoma, NY (US)

(72) Inventor: Cary Chu, Mount Sinai, NY (US)

(73) Assignee: SOTER TECHNOLOGIES, LLC, Ronkonkoma, NY (US)

( * ) Notice: Subject to any disclaimer, the term of this patent is extended or adjusted under 35 U.S.C. 154(b) by 0 days.

(21) Appl. No.: 17/234,933

(22) Filed: Apr. 20, 2021

(65) Prior Publication Data

US 2021/0327438 A1   Oct. 21, 2021

Related U.S. Application Data

(60) Provisional application No. 63/013,091, filed on Apr. 21, 2020.

(51) Int. Cl.
  *G10L 17/26*    (2013.01)
  *G10L 17/06*    (2013.01)
  (Continued)

(52) U.S. Cl.
  CPC .............. *G10L 17/26* (2013.01); *G10L 17/06* (2013.01); *G10L 25/18* (2013.01); *G10L 25/51* (2013.01);
  (Continued)

(58) Field of Classification Search
  CPC ......... G10L 17/26; G10L 17/06; G10L 25/18; G10L 25/51; G10L 25/78; G10L 2025/783
  (Continued)

(56) References Cited

U.S. PATENT DOCUMENTS

| 3,933,029 A | 1/1976 | Rabenecker et al. |
| 5,261,596 A | 11/1993 | Tachibana et al. |

(Continued)

FOREIGN PATENT DOCUMENTS

| CA | 2740454 C | 11/2015 |
| GB | 2401752 A | 11/2004 |

(Continued)

OTHER PUBLICATIONS

International Search Report and Written Opinion issued in International Application No. PCT/US2021/028072 dated Jul. 6, 2021, pp. 1-17.

(Continued)

*Primary Examiner* — Pierre Louis Desir
*Assistant Examiner* — Nicole A K Schmieder
(74) *Attorney, Agent, or Firm* — Carter, DeLuca & Farrell LLP; George Likourezos

(57) ABSTRACT

Systems and methods for identifying potential bullying are disclosed. In various aspects, a system for identifying potential bullying includes a sound detector configured to provide samples of sounds over time, a processor, and a memory storing instructions. The instructions, when executed by the processor, cause the system to determine that a noise event has occurred by processing the samples to determine that the sounds exceed a sound level threshold over a time period that exceeds a time period threshold, process the samples to provide frequency spectrum information of the noise event, determine whether the noise event is a potential bullying occurrence based on comparing the frequency spectrum information of the noise event and at least one frequency spectrum profile, and initiate a bullying notification in a case of determining that the noise event is a potential bullying occurrence.

18 Claims, 6 Drawing Sheets

(51) Int. Cl.
　　　*G10L 25/18* (2013.01)
　　　*G10L 25/51* (2013.01)
　　　*G10L 25/78* (2013.01)

(52) U.S. Cl.
　　　CPC ........ *G10L 25/78* (2013.01); *G10L 2025/783* (2013.01)

(58) Field of Classification Search
　　　USPC .......................................................... 704/270
　　　See application file for complete search history.

(56) References Cited

U.S. PATENT DOCUMENTS

| | | | |
|---|---|---|---|
| 5,451,929 | A | 9/1995 | Adelman et al. |
| 5,856,780 | A | 1/1999 | McGeehin |
| 6,208,252 | B1 | 3/2001 | Danilychev |
| 6,711,470 | B1 | 3/2004 | Hartenstein et al. |
| 6,998,991 | B1 | 2/2006 | Goldstein et al. |
| 7,588,726 | B1 | 9/2009 | Mouradian |
| 8,175,297 | B1 | 5/2012 | Ho et al. |
| 9,311,807 | B2 | 4/2016 | Schultz |
| 9,870,719 | B1 * | 1/2018 | Watkins ............ G10L 21/0208 |
| 10,699,549 | B2 | 6/2020 | Peterson et al. |
| 10,937,295 | B2 | 3/2021 | Peterson et al. |
| 10,970,987 | B2 | 4/2021 | Peterson et al. |
| 11,024,145 | B2 | 6/2021 | Peterson et al. |
| 2002/0002464 | A1 | 1/2002 | Petrushin |
| 2002/0152792 | A1 | 10/2002 | Wang et al. |
| 2005/0199735 | A1 | 9/2005 | Eisenhour et al. |
| 2008/0300817 | A1 | 12/2008 | Bieswanger et al. |
| 2010/0127865 | A1 | 5/2010 | Marriam et al. |
| 2012/0253813 | A1 * | 10/2012 | Katagiri ................. G10L 25/78 704/254 |
| 2013/0255482 | A1 | 10/2013 | Goodson |
| 2013/0284192 | A1 | 10/2013 | Peleg et al. |
| 2014/0046878 | A1 * | 2/2014 | Lecomte ................. G10L 25/51 706/12 |
| 2014/0169795 | A1 * | 6/2014 | Clough .................. G08C 23/04 398/106 |
| 2014/0202787 | A1 | 7/2014 | Richardson et al. |
| 2014/0260692 | A1 | 9/2014 | Sharp |
| 2014/0361901 | A1 | 12/2014 | Hoefer |
| 2015/0020614 | A1 | 1/2015 | Gettings et al. |
| 2015/0070148 | A1 * | 3/2015 | Cruz-Hernandez ..... G06F 3/167 340/407.1 |
| 2015/0097678 | A1 | 4/2015 | Sloo et al. |
| 2015/0153171 | A1 | 6/2015 | Zhou et al. |
| 2015/0185069 | A1 | 7/2015 | Meerpohl |
| 2015/0235652 | A1 | 8/2015 | Moser |
| 2015/0241993 | A1 | 8/2015 | Gallo et al. |
| 2015/0256355 | A1 | 9/2015 | Pera et al. |
| 2015/0323427 | A1 | 11/2015 | Sharp |
| 2016/0050037 | A1 | 2/2016 | Webb |
| 2016/0063841 | A1 | 3/2016 | Schultz et al. |
| 2016/0102879 | A1 | 4/2016 | Guest et al. |
| 2016/0163168 | A1 | 6/2016 | Brav et al. |
| 2016/0212828 | A1 | 7/2016 | Leinen et al. |
| 2016/0260513 | A1 | 9/2016 | Pan et al. |
| 2017/0023457 | A1 | 1/2017 | Hart et al. |
| 2017/0042247 | A1 | 2/2017 | Xiang |
| 2017/0055572 | A1 | 3/2017 | Utley et al. |
| 2017/0227508 | A1 | 8/2017 | Cai et al. |
| 2017/0284690 | A1 | 10/2017 | Lipanov |
| 2017/0309091 | A1 | 10/2017 | Cameron et al. |
| 2017/0321923 | A1 | 11/2017 | Wiens-Kind et al. |
| 2018/0050230 | A1 | 2/2018 | Toland |
| 2018/0195987 | A1 | 7/2018 | Hur |
| 2018/0286208 | A1 | 10/2018 | Baker et al. |
| 2019/0108739 | A1 | 4/2019 | Wedig et al. |
| 2019/0259378 | A1 | 8/2019 | Khadloya et al. |
| 2020/0011779 | A1 | 1/2020 | Lavrovsky et al. |
| 2020/0066126 | A1 * | 2/2020 | Voor ................... H04L 63/0428 |
| 2020/0097743 | A1 * | 3/2020 | Shiga ................. G06K 9/00832 |
| 2020/0302951 | A1 * | 9/2020 | Deng ................. G08B 21/0208 |
| 2021/0183223 | A1 | 6/2021 | Peterson et al. |

FOREIGN PATENT DOCUMENTS

| | | |
|---|---|---|
| KR | 101778681 B1 | 9/2017 |
| WO | 2019035950 A1 | 2/2019 |
| WO | 2019/122413 A1 | 6/2019 |
| WO | 2020005431 A1 | 1/2020 |

OTHER PUBLICATIONS

Examination Report No. 1 issued in corresponding Australian Appl. No. 2018316677 dated Aug. 10, 2020 (7 pages).
Office Action issued by the U.S Patent and Trademark Office dated Jul. 17, 2020 in corresponding U.S. Appl. No. 16/824,347.
Office Action issued by the U.S Patent and Trademark Office dated Apr. 27, 2020 in corresponding U.S. Appl. No. 16/812,969.
The MagPi Magazine, "Raspberry PI 3: Specs, Benchmarks & Testing," Dec. 31, 2016, retrieved on Apr. 19, 2019 from https://www.raspberrypi.org/magpi/raspberry-pi-3-specs-benchmarks/.
International Search Report and Written Opinion issued by the U.S. Patent and Trademark Office acting as International Searching Authority in International Application No. PCT/US2019/018532 dated May 1, 2019.
International Preliminary Report on Patentability dated Feb. 18, 2020 by the U.S. Patent and Trademark Office acting as International Searching Authority in corresponding International Application No. PCT/US2018/000223.
Notice of Allowance issued by the U.S. Patent and Trademark Office dated Aug. 3, 2020 in corresponding U.S. Appl. No. 16/812,969.
International Search Report and Written Opinion issued by the U.S. Patent and Trademark Office acting as International Searching Authority in International Application No. PCT/US18/00223 dated Nov. 15, 2018.
Australian Examination Report No. 2 issued in corresponding Appl. No. AU 2018316677 dated Feb. 10, 2021 (7 pages).
Extended European Search Report issued in corresponding application EP 18846742.7 dated Mar. 30, 2021 (12 pages).

\* cited by examiner

SYSTEMS AND METHODS FOR IMPROVED ACCURACY OF BULLYING OR ALTERCATION DETECTION OR IDENTIFICATION OF EXCESSIVE MACHINE NOISE

BACKGROUND

Technical Field

The present disclosure relates to systems and methods for detecting potential bullying or altercation or excessive machine noise. More particularly, the present disclosure relates to systems and methods which improve accuracy of bullying or altercation detection or which identify excessive machine noise.

Background

Bullying is a serious problem in academic and business environments due to harmful effects on people and on productivity. Altercations in a workplace can also increase risks of a hostile work environment. Camera surveillance systems have been developed to identify bullying and altercations. However, such camera surveillance systems have not and cannot be used in private areas such as restrooms, bathrooms, shower rooms, or hospital rooms, where privacy takes priority. At the same time, bullying has become more serious among younger people, and altercations in the workplace have become more widespread, due in part to divisive developments in social and political discourse, among other things. Accordingly, there is interest in developing and improving systems and methods for effective identification of potential bullying or altercation.

SUMMARY

The present disclosure provides systems and methods for identifying potential bullying or altercation based on sound information or for identification of excessive machine noise. As described below, aspects of the disclosed systems and methods utilize frequency spectrum information of a noise event to improve the accuracy of identifying whether the noise event is a potential bullying or altercation occurrence. Aspects of the present disclosure will be described with respect to potential bullying. However, it is intended and shall be understood that such disclosure applies to detection of potential altercations as well. Other aspects of the present disclosure relate to identifying whether a location may have excessive machine noise, such as in a hospital room.

In accordance with aspects of the present disclosure, a system for identifying potential bullying includes a sound detector configured to provide samples of sounds over time, a processor, and a memory storing instructions. The instructions, when executed by the processor, cause the system to determine that a noise event has occurred by processing the samples to determine that the sounds exceed a sound level threshold over a time period that exceeds a time period threshold, process the samples to provide frequency spectrum information of the noise event, determine whether the noise event is a potential bullying occurrence based on comparing the frequency spectrum information of the noise event and at least one frequency spectrum profile, and initiate a bullying notification in a case of determining that the noise event is a potential bullying occurrence.

In various aspects of the system, the instructions, when executed by the processor, further cause the system to cause the sound detector to provide samples of sounds in a learning mode in absence of any bullying occurrence, and determine at least one of the sound level threshold or the time period threshold based on the samples of sounds from the learning mode.

In various aspects of the system, the samples of sounds in the learning mode reflect non-bullying conversation, and the instructions, when executed by the processor, further cause the system to set at least one of the sound level threshold or the time period threshold so as to exclude the non-bullying conversation from the learning mode as a noise event.

In various aspects of the system, the samples of sounds in the learning mode reflect non-bullying sounds, and the instructions, when executed by the processor, further cause the system to set at least one of the sound level threshold or the time period threshold so as to exclude at least one of the non-bullying sounds from the learning mode as a noise event.

In various aspects of the system, the sound level threshold and the time period threshold qualify at least one other of the non-bullying sounds from the learning mode as a noise event.

In various aspects of the system, in determining whether the noise event is a potential bullying occurrence, the instructions, when executed by the processor, cause the system to determine whether the noise event is a potential bullying occurrence based on comparing the frequency spectrum information of the at least one other of the non-bullying sounds and at least one frequency spectrum profile.

In various aspects of the system, in determining that the noise event is a potential bullying occurrence, the instructions, when executed by the processor, cause the system to determine that the frequency spectrum information of the noise event includes frequency dominance between 100 Hz and 10 kHz. In various aspects of the system, the frequency dominance between 100 Hz and 10 kHz includes a frequency profile between 100 Hz and 10 kHz having a triangular shape, which is generally associated with human voices.

In various aspects of the system, in comparing the frequency spectrum information of the noise event and the at least one frequency spectrum profile, the instructions, when executed by the processor, cause the system to compare the frequency spectrum information of the noise event to a frequency spectrum profile having substantially uniform frequency profile, which is generally associated with machine noise.

In various aspects of the system, the instructions, when executed by the processor, further cause the system to not initiate a bullying notification in a case of determining that the frequency spectrum information of the noise event matches the substantially uniform frequency profile.

In accordance with aspects of the present disclosure, a method for identifying potential bullying includes accessing samples of sounds over time provided by a sound detector, determining that a noise event has occurred by processing the samples to determine that the sounds exceed a sound level threshold over a time period that exceeds a time period threshold, processing the samples to provide frequency spectrum information of the noise event, determining whether the noise event is a potential bullying occurrence based on comparing the frequency spectrum information of the noise event and at least one frequency spectrum profile, and initiating a bullying notification in a case of determining that the noise event is a potential bullying occurrence.

In various aspects of the method, the method includes causing the sound detector to provide samples of sounds in a learning mode in absence of any bullying occurrence, and determining at least one of the sound level threshold or the time period threshold based on the samples of sounds from the learning mode.

In various aspects of the method, the samples of sounds in the learning mode reflect non-bullying conversation, and the method includes setting at least one of the sound level threshold or the time period threshold so as to exclude the non-bullying conversation from the learning mode as a noise event.

In various aspects of the method, the samples of sounds in the learning mode reflect non-bullying sounds, and the method includes setting at least one of the sound level threshold or the time period threshold so as to exclude at least one of the non-bullying sounds from the learning mode as a noise event.

In various aspects of the method, the sound level threshold and the time period threshold qualify at least one other of the non-bullying sounds from the learning mode as a noise event.

In various aspects of the method, determining whether the noise event is a potential bullying occurrence includes determining whether the noise event is a potential bullying occurrence based on comparing the frequency spectrum information of the at least one other of the non-bullying sounds and at least one frequency spectrum profile.

In various aspects of the method, determining that the noise event is a potential bullying occurrence includes determining that the frequency spectrum information of the noise event includes frequency dominance between 100 Hz and 10 kHz. In various aspects of the method, the frequency dominance between 100 Hz and 10 kHz includes a frequency profile between 100 Hz and 10 kHz having a triangular shape.

In various aspects of the method, comparing the frequency spectrum information of the noise event and the at least one frequency spectrum profile includes comparing the frequency spectrum information of the noise event to a frequency spectrum profile having substantially uniform frequency profile.

In various aspects of the method, the method includes not initiating a bullying notification in a case of determining that the frequency spectrum information of the noise event matches the substantially uniform frequency profile.

In accordance with aspects of the present disclosure, a method for identifying excessive machine noise includes accessing samples of sounds over time provided by a sound detector; determining that noise events have occurred based on processing the samples; for each noise event: processing the samples associated with the noise event to provide frequency spectrum information of the noise event, and determining whether the noise event is a machine generated sound occurrence based on comparing the frequency spectrum information of the noise event and at least one frequency spectrum profile; and initiating a discomfort notification in a case of the noise events indicating excessive machine noise based on at least one of a threshold or a criterion.

In various aspects of the method, the method includes causing the sound detector to provide samples of sounds in a learning mode in absence of machine generated sound occurrence, and determining at least one of a sound level threshold or a time period threshold based on the samples of sound levels from the learning mode, wherein each noise event is identified based on at least one of the sound level threshold or the time period threshold.

In various aspects of the method, the samples of sounds in the learning mode reflect human conversation, and the method includes setting at least one of the sound level threshold or the time period threshold so as to exclude the human conversation from the learning mode as a noise event.

In various aspects of the method, determining whether the noise event is a machine generated sound occurrence includes comparing the frequency spectrum information of the noise event with a frequency spectrum information of the human conversation.

In various aspects of the method, determining whether the noise event is a machine generated noise occurrence includes determining that the frequency spectrum information of the noise event includes frequency dominance between 100 Hz and 20 kHz.

In various aspects of the method, the frequency dominance between 100 Hz and 10 kHz includes a frequency profile between 100 Hz and 10 kHz having a triangular shape.

In various aspects of the method, comparing the frequency spectrum information of the noise event and the at least one frequency spectrum profile includes comparing the frequency spectrum information of the noise event to a frequency spectrum profile having substantially uniform frequency profile.

In various aspects of the method, the method includes not initiating a discomfort notification in a case of the noise events indicating acceptable machine noise based on at least one of the threshold or the criterion.

Further details and aspects of exemplary aspects of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

The present disclosure provides systems and methods for identifying potential bullying or altercation based on sound information or for identifying excessive machine noise. As described below, aspects of the disclosed systems and methods utilize frequency spectrum information of a noise event to improve the accuracy of identifying whether the noise event is a potential bullying or altercation occurrence. When potential bullying or altercation is identified, warnings or alerts are transmitted to registered users or clients without providing any indication of warnings to one or more persons who are engaged in the potential activity. In this way, one or more persons who are engaged in potential bullying or altercation can be properly reported and appropriately supervised later. Aspects of the present disclosure will be described with respect to potential bullying. However, it is intended and shall be understood that such disclosure applies to detection of potential altercations as well. Other aspects of the present disclosure relate to identifying excessive machine noise, such as in a hospital room.

Figure 1:
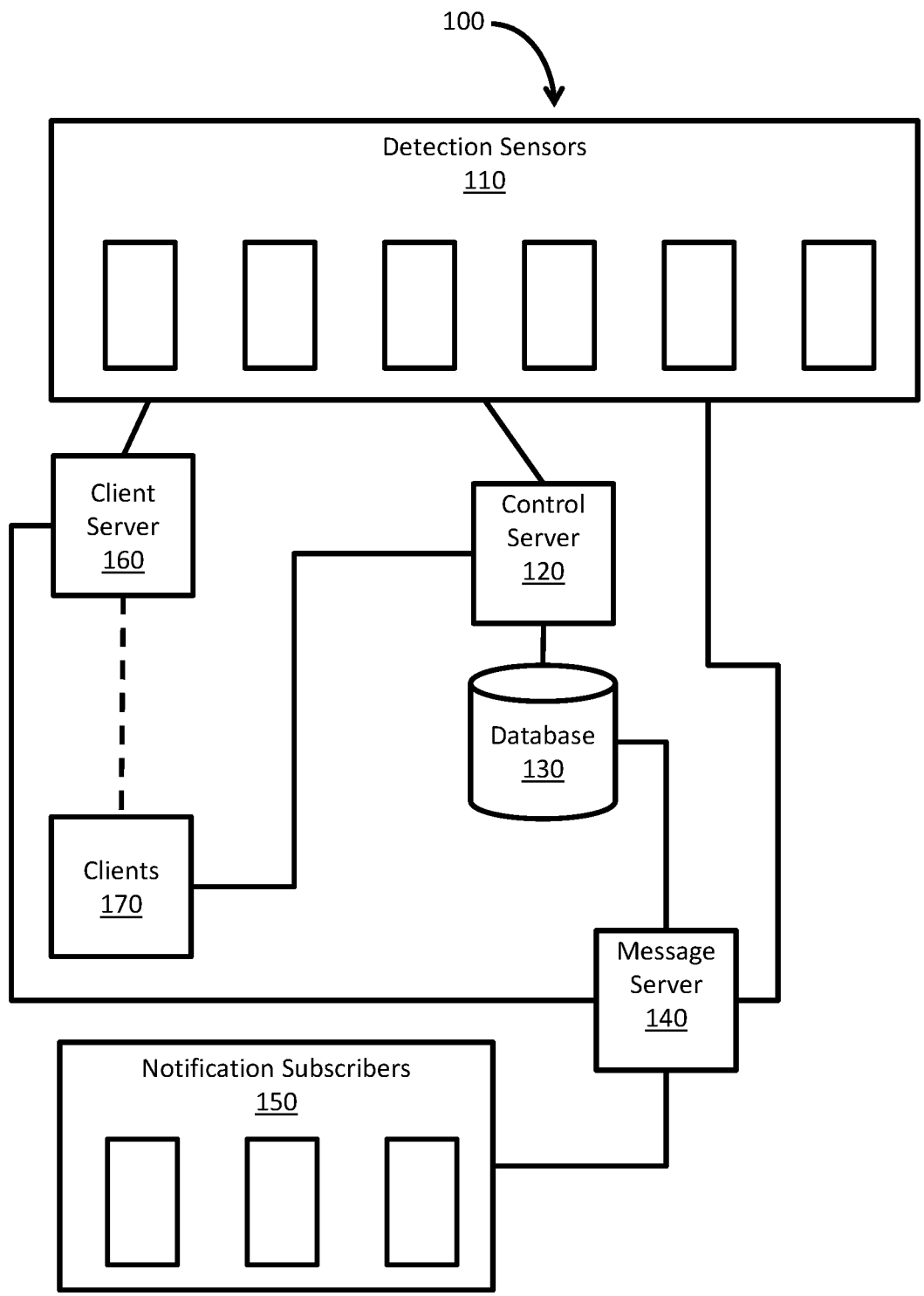
FIG. 1 is a block diagram of an exemplary detection system for identifying potential bullying, in accordance with aspects of the present disclosure.

FIG. 1 illustrates a block diagram showing a detection system 100 according to aspects of the present disclosure. The detection system 100 includes one or more detection sensors 110 which detect sound related to noise disturbance at enclosed sites such as, without limitation, schools or medical facilities. In various aspects, the detection sensors 110 can be sensitive to sounds across a frequency spectrum, such as between 100 Hz and 10 kHz, between 100 Hz and 20 kHz, or between 100 Hz and another frequency above 10 kHz, among other frequency ranges. Each detection sensor 110 can provide an audio signal that reflects the sounds it senses in the frequency spectrum. The detection system 100 further includes a control server 120 for controlling various aspects described herein, such as identifying whether or not bullying is potentially occurring at the enclosed site, and a database 130 storing data related to identifying potential bullying and historical data of detected sounds at each enclosed site.

In various aspects, the detected sounds may be analyzed by the detection sensors 110 or the detected sounds may be transmitted to the control server 120. The control server 120 may communicate with the detection sensors 110 by calling functions of application programming interface ("API") between the detection sensor 110 and the control server 120. In this manner, the detection sensor 110 can push data to the control server 120 and respond to requests from the control server 120.

The control server 120 may analyze the detected sounds based on data stored at the database 130 and determine whether bullying potentially may have occurred or may be occurring at the enclosed sites. The data stored at the database 130 may be location-dependent, such that that data associated with one location may be different from data associated with another location or site. For example, at a bathroom location, there are flushing sounds, casual conversations, and/or cleaning sounds, among other sounds. Based on the size of the bathroom and the installation location of the detection sensor 110, the detection sensor 110 may detect sounds differently from other detection sensors 110 installed within the same bathroom. Thus, the location-dependent data may be different based on the installation locations even at the same site or within the same room, area, or region.

For these reasons, and in accordance with aspects of the present disclosure, the location-dependent data is obtained at the site or at the locations of the detection sensors 110 using a learning mode. The location-dependent data may be obtained for a period of time that is determined based on the environment of the enclosed site and the installation location of the detection sensor 110. For example, in various aspects, the learning mode can operate for a period of time that may vary depending on the installation location, the time, the day of the week, and/or the date. After obtaining location-dependent data for a period sufficiently long enough to form a profile for the location, the detection sensor 110 may be turned to an active mode to identify noise events.

In an aspect, the detection sensor 110 can transmit detected sounds to the control server 120, and the control server 120 may acquire data from the database 130 based on the location where the detection sensor 110 is installed and/or the time when the sounds are detected, among other things. The control server 120 can analyze the detected sounds to identify noise events and determine occurrence of potential bullying based on the data from the database 130, which will be described in more detail below. The control server 120 may use a query language to request data from the database 130. The query language may be SQL, MySQL, SSP, C, C++, C#, PHP, SAP, Sybase, Java, JavaScript, or any language, which can be used to request data from a database.

In various aspects, the data from the database 130 may be saved in a memory (not shown) of the detection sensor 110. In such aspects, the detection sensor 110 may identify noise events and may determine potential bullying by itself without processing by the control server 120. In this case, the detection sensor 110 includes hardware and software/firmware configured to perform such operations, and the detection sensor 110 communicates the result of its determination to the control server 120. In various aspects, the sounds processed by detection sensor 110 may not leave the detection sensor 110, which protects data privacy and the privacy of people at the site or location. In various aspects, the control server 120 may not store detected results from the detection sensors 110 because of privacy issues.

In an aspect, various data stored in the database 130 may be location-independent, such that the data may be the same for multiple sites or locations. The location-independent data can include sounds that present the same way across multiple locations or sites, such as alarm sounds, school bell sounds, or construction sounds, for example. In various aspects, location-independent data may be obtained and/or loaded to the detection system 100 prior to installation at a particular site or location.

In various aspects, the database 130 may include historical sensor data and/or historical determinations relating to potential bullying, such as time-series and location-specific data for each location where the detection sensor 110 has been installed. In an aspect, the control server 120 may analyze the historical data to predict occurrences bullying at the location so that appropriate actions may be proactively taken at the location.

In an aspect, the control server 120 may analyze the historical data stored at the database 130 to identify trends in the historical data. For example, the trends may indicate a decrease or increase of occurrences of potential bullying. In various aspects, in case a decreasing or increasing pattern is identified, the control server 120 may adjust various parameters for identifying potential bullying to make the detection sensor 110 more or less sensitive.

In an aspect, the control server 120 may send a command to the detection sensor 110 to adjust internal parameters for detecting potential bullying. Internal parameters of the detection sensor 110 may include LED functionality, sound threshold, time threshold, networking server IP address, alert timeout, serial number, reboot setting, latest firmware version, and/or parameters for an algorithm for identifying potential bullying, such as Fast Fourier Transform parameters, which will be described later herein. This list of parameters is not exhaustive and is provided only for exemplary purposes. In an aspect, the control server 120 may update internal parameters via text or binary files. Internal parameters for each the detection sensor 110 may be saved in the database 130.

In an aspect of the present disclosure, the control server 120 may control the detection sensors 110 collectively, individually, or group by group. For example, several detection sensors 110 may be installed at the same site. When the system needs to update internal parameters or settings, the control server 120 may control the detection sensors 110 collectively at the site. However, such control may not affect the detection sensors 110 installed in the other sites. In yet another aspect, even when several detection sensors 110 are installed at the same site, the control server 120 may control them differently because one the detection sensor 110 may have different parameters for identifying potential bullying from those of another detection sensor 110 due to different installation locations at the site.

With continuing reference to FIG. 1, client devices 170 may log in to the control server 120 to see graphical representations of the detection results from the detection sensors 110 via Internet. Communication between the client devices 170 and the control server 120 may utilize http, https, ftp, SMTP, or related Internet protocols. The client devices 170 may be able to control settings for each of the detection sensors 110. For example, the settings may include a mode of warnings (e.g., an email, text message, telephone call, instant message, audible warning, etc.), an address, to which such warnings are to be sent in case of identification of potential bullying, and the like. The client devices 170 are used by the persons responsible for the sites where the detection sensors 110 are installed. For example, users of the client devices 170 may be a principal of a school, a vice president of a company, security personnel of a school or company, or a manager at a hospital, among others. This list, however, is not meant to be exhaustive but is provided only for illustrating examples. Other people of various titles and ranks at various types of locations can be a user of a client device 170.

In the illustrated system of FIG. 1, when a detection sensor 110 identifies potential bullying, the detection sensor 110 may send an alert to the client devices 170 via a client server 160 using protocols for Internet communications. In various aspects, the client server 160 may send a simple message or email or other notification to the client devices 170 of persons supervising the site where the potential bullying is detected. The client server 160 may manage the clients registered on the client server 160 and show alert history and other notification upon requests from the client devices 170. Further, the client server 160 may handle alerts to the client devices 170 when the detection sensors 110 need to reboot, update, or receive configuration. In an aspect, communications between the client server 160 and the client devices 170 are indicated by a dotted line to indicated that there may not be a reliable or persistent communication path between them. In various aspects, the client devices 170 may be a computer, laptop, tablet, smart device, mobile phone, or smart watch, among other things.

Alerting the client devices 170 in the manner provided by the disclosed system may enable responsible persons to timely and properly respond to occurrences of potential bullying. Additional alert mechanisms are contemplated. In various aspects, when the client server 160 receives an alert from the detection sensor 110, the client server 160 may communicate with a message server 140 configured to push alerts to notification subscriber devices 150. The notification subscriber devices 150 are devices of people who may be additional personnel to be alerted, but who do not have direct access to the control server 120, as illustrated in FIG. 1. Similar to the ways the client server 160 sends alerts to the client devices 170, the message server 140 sends alerts to the notification subscriber devices 150 via a text message, email, instant message, telephone call, and/or audible warning, or any communication readily available to a person skilled in the art. In various aspects, the notification subscriber devices 150 may be a computer, a laptop, a tablet, smart device, mobile phone, or a smart watch, among other devices.

As described above, the detection sensors 110 may include hardware and software/firmware for detecting potential bullying without processing of data by the control server 120. In such aspects, when potential bullying is identified, the detection sensor 110 may directly communicate with the message server 140 and the client server 160 to transmit alerts to persons in charge of or responsible for the sites where the detection sensors 110 are installed. In various aspects, the control server 120 may also or may instead control communications with the client devices 170 and the notification subscriber devices 150.

FIG. 1 is exemplary, and variations are contemplated to be within the scope of the present disclosure. For example, in various aspects, the control server 120 may directly communicate with the client server 160 and/or with the message server 140. In various aspects, there may be multiple servers and/or databases. Other variations are contemplated to be within the scope of the present disclosure.

Figure 2:
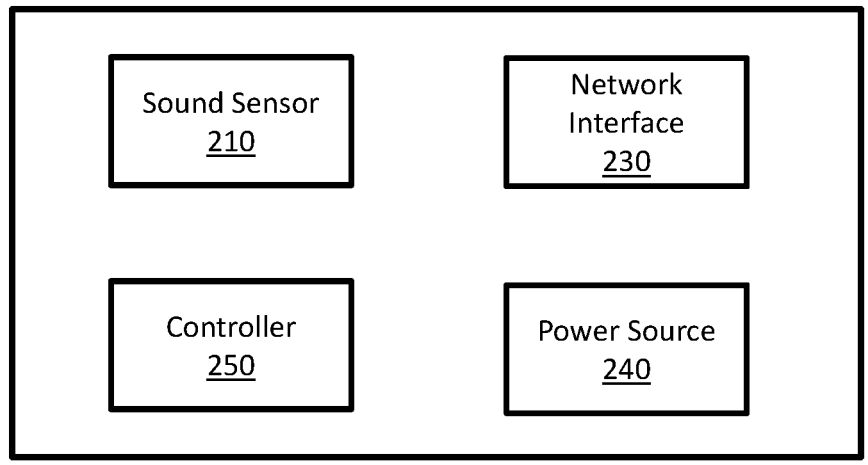
FIG. 2 is a block diagram of exemplary components of a detection sensor, in accordance with aspects of the present disclosure.

Referring now to FIG. 2, there is shown a block diagram of exemplary components of a detection sensor in accordance with aspects of the present disclosure. The illustrated detection sensor includes a sound sensor 210, a network interface 230, a power source 240, and a controller 250.

The sound sensor 210 may be used for detecting sounds. In various aspects, the detected sounds may be provided by the sound detector in the form of analog voltage amplitudes or in the form of digital values/samples.

In accordance with aspects of the present disclosure, threshold values are used for identifying noise events. As used herein, a "noise event" refers to sounds that exceed a sound level threshold over a time period that exceeds a time period threshold. In various aspects, a noise event can be identified based on sound level of the sound samples exceeding a sound level threshold a particular number of times, such as once, five times, or one-hundred times, or another number of times, over a time period. The particular number of samples that must exceed the sound level threshold to qualify as a noise event can vary based on the sampling frequency and/or the time period duration, among other factors. In various aspects, a noise event can be identified based on a particular percentage of sound samples exceeding a sound level threshold over a time period, such as twenty percent of samples, fifty percent of samples, or one-hundred percent of samples, or another percentage of samples, over a time period. The particular percentage of samples that must exceed the sound level threshold to qualify as a noise event can vary based on the sampling frequency and/or the time period duration, among other factors.

In various aspects, a time period can be a recurring time interval, such as recurring one-second intervals, recurring five-second intervals, or recurring ten-second intervals, or another interval duration. The recurring intervals may be contiguous such that each interval is immediately followed by a subsequent interval. In various aspects, the recurring intervals may be non-contiguous, such that an interval is not immediately followed by a subsequent interval. In various aspects, a time period can be an interval that begins when a sound level above a sound level threshold is detected, and that ends after a predetermined length of time elapses, such as one second, five seconds, or ten seconds, or another length of time. In various aspects, a time period can be an interval that begins when any sound is detected and that ends after a predetermined length of time elapses, such as one second, five seconds, or ten seconds, or another length of time. The length of time for a time period can vary based on various factors, such as the type of noise event(s) of interest. As an example, and without limitation, for a noise event related to potential bullying in a school bathroom, the length of time for a time period can be ten seconds. A more detailed description of sound level thresholds and time period thresholds will be described in connection with FIG. 3.

With continuing reference to FIG. 2, the network interface 230 may be configured to transmit sensed results to the control server 120. In an aspect, the network interface 230 may transmit a request to send an alert, when potential bullying is identified, to the message server 140 and to the client server 160. Further, the network interface 230 may receive a command to update internal settings or parameters from the control server 120. In an aspect, the network interface 230 may communicate with other devices wirelessly or via a wired connection. Wireless connections may operate in a wide area network (WAN), local area network (LAN), personal area network (PAN), ad hoc network, and/or cellular network, among other networks. A wired network may utilize category 5 cable (CAT5), CAT5E, category 6 cable (CAT6), or other cables.

The sound sensor 210 and the network interface 230 may be powered by the power source 240. In an aspect, the power source 240 may be circuitry that receives and conveys power supplied over a network cable, such as CAT5 or CAT6 cable, based on a technology called Power-over-Ethernet (PoE) or active Ethernet. PoE+ and 4PPoE may be used to supply power. Because the network cable supplies power, the illustrated detection sensor may be installed everywhere the network cable can be installed without connecting to an electrical outlet. In various aspects, batteries may be installed to supply power to the detection sensor, and the batteries may be the power source 240. In various aspects, the power source 240 may utilize a connection to an electrical outlet so that the power source 240 may be a converter circuit that receives and converts power from an electrical outlet.

The detection sensor further includes a controller 250, which controls functions and settings of the detection sensor. The controller 250 may be referred to interchangeably as a processor. In various aspects, when the detection sensor is powered, the controller 250 sets settings of the detection sensor and internal parameters of the sound sensor 210. The controller 250 can further control the network interface 230 to transmit detected results or requests for sending alerts when potential bullying is detected, and/or to reset or update settings and internal parameters upon reception of commands from a control server 120. The controller 250 may be execute or operate based on Linux, Windows, Android, iOS, or similar software operation system. In an aspect, the controller 250 includes hardware components, such as a digital signal processor (DSP), a microcontroller, a central processing unit (CPU), application-specific integrated circuit (ASIC), field-programmable gate array (FPGA), graphics processing unit (GPU), programmable read-only memory (e.g., PROM, EPROM, EEPROM, etc.), and/or random access memory (RAM), among other components that will be known to persons skilled in the art.

In an aspect, the illustrated detection sensor of FIG. 2 may not be equipped with a warning system. Thus, when potential bullying is detected at the installation site, any person who is engaged in the potential bullying would not be alerted that the potential bullying has been reported to the client devices 170 and the notification subscribers 150 because the alert is reported silently.

FIG. 2 is exemplary, and variations are contemplated to be within the scope of the present disclosure. For example, a detection sensor can include other components not specifically illustrated, such as memory, electronic storage, and/or other types of sensors, such as air quality sensors. Additionally, there may be multiple network interfaces. Other variations are contemplated to be within the scope of the present disclosure.

Figure 3:
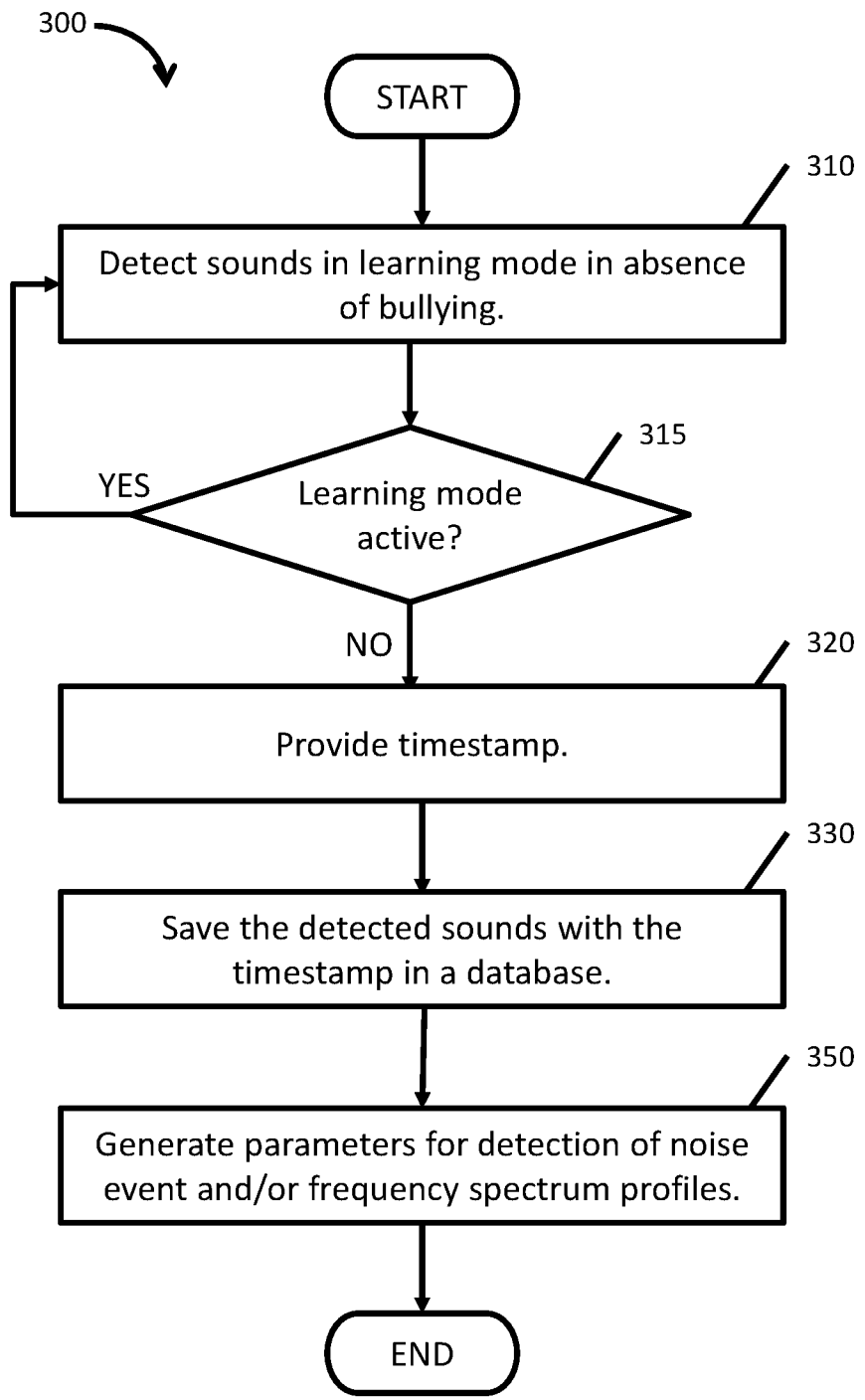
FIG. 3 is a flow diagram of an exemplary learning mode operation and configuration operation, in accordance with aspects of the present disclosure.

Referring now to FIG. 3, there is shown a flowchart for an operation 300 of the learning mode for a detection sensor, in accordance with aspects of the present disclosure. The learning mode operates to configure parameters for detecting a noise event and to provide frequency spectrum information for improving accuracy of identifying potential bullying.

In block 310, the sound sensor detects sounds in a learning mode. As described above herein, the sound sensor can be sensitive to sounds across a frequency spectrum, such as between 100 Hz and 10 kHz, and can provide a signal that reflects the sounds it senses in the spectrum. In various aspects, the learning mode for a detection sensor can be activated by a user manually engaging a switch or button or other manual mechanism of the detection sensor. In various aspects, the learning mode for a detection sensor can be electronically activated by a user though an interface screen of a display. As long as the learning mode is active (315), the sound detector continues to detect sounds. In various aspects, the sound detector can buffer the detected sounds. In various aspects, detected sounds can be communicated to a control server in real time as the sounds are detected. In various aspects, detected sounds can be communicated to a control server after the learning mode is deactivated.

In accordance with aspects of the present disclosure, during the learning mode, a user can present sounds to the detection sensor that do not correspond to bullying. For example, for a detection sensor installed in a school bathroom, a user may not want background noises, toilet flushes, running water, casual conversation, school bells, and/or construction noises, among others, to be identified as a potential bullying event. Background noises can include, for example, noises from a ventilation or air conditioning system, among other things. Therefore, a user may introduce those sounds during the learning mode of a detection sensor, so that the detection sensor can, as much as possible, exclude such sounds from being a noise event or exclude such sounds from being a potential bullying occurrence.

The learning mode for a detection sensor can be deactivated by a user manually disengaging a switch or button or other manual mechanism of the detection sensor. In various aspects, the learning mode for a detection sensor can be electronically deactivated by a user though an interface screen of a display. When the learning mode is deactivated (315), the detected sounds are combined with a corresponding timestamp in block 320. The timestamp may include the time, the day of the week, the day, and/or the month when the sound is detected. In various aspects, the timestamp can be provided by a detection sensor or by a control server. The combined data is then saved in a database in block 330.

The operation 300 proceeds to block 350, in which the sounds from the learning mode are analyzed to configure parameters for detecting a noise event and/or to generate frequency spectrum profiles for improving accuracy of detecting a potential bullying occurrence. In accordance with aspects of the present disclosure, a two-step approach is disclosed for improving accuracy of detecting potential bullying. At step one, the disclosed system identifies whether a sound is sufficiently loud and/or long to qualify as a noise event. If the sound does not qualify as a noise event, then the sound is not treated as a potential bullying occurrence. At step two, if the sound qualifies as a noise event, then frequency spectrum information for the noise is analyzed and compared to various frequency spectrum profiles to determine whether or not it is characteristic of a potential bullying occurrence. Accordingly, block 350 of FIG. 3 analyzes sounds from the learning mode to configure parameters and provide frequency spectrum information.

The operation of FIG. 3 is exemplary, and variations are contemplated to be within the scope of the present disclosure. In various aspects, only one sound can be presented during each activation and deactivation cycle of a learning mode. In various aspects, multiple sounds can be presented during each activation and deactivation cycle of a learning mode. Other variations are contemplated to be within the scope of the present disclosure.

Figure 4:
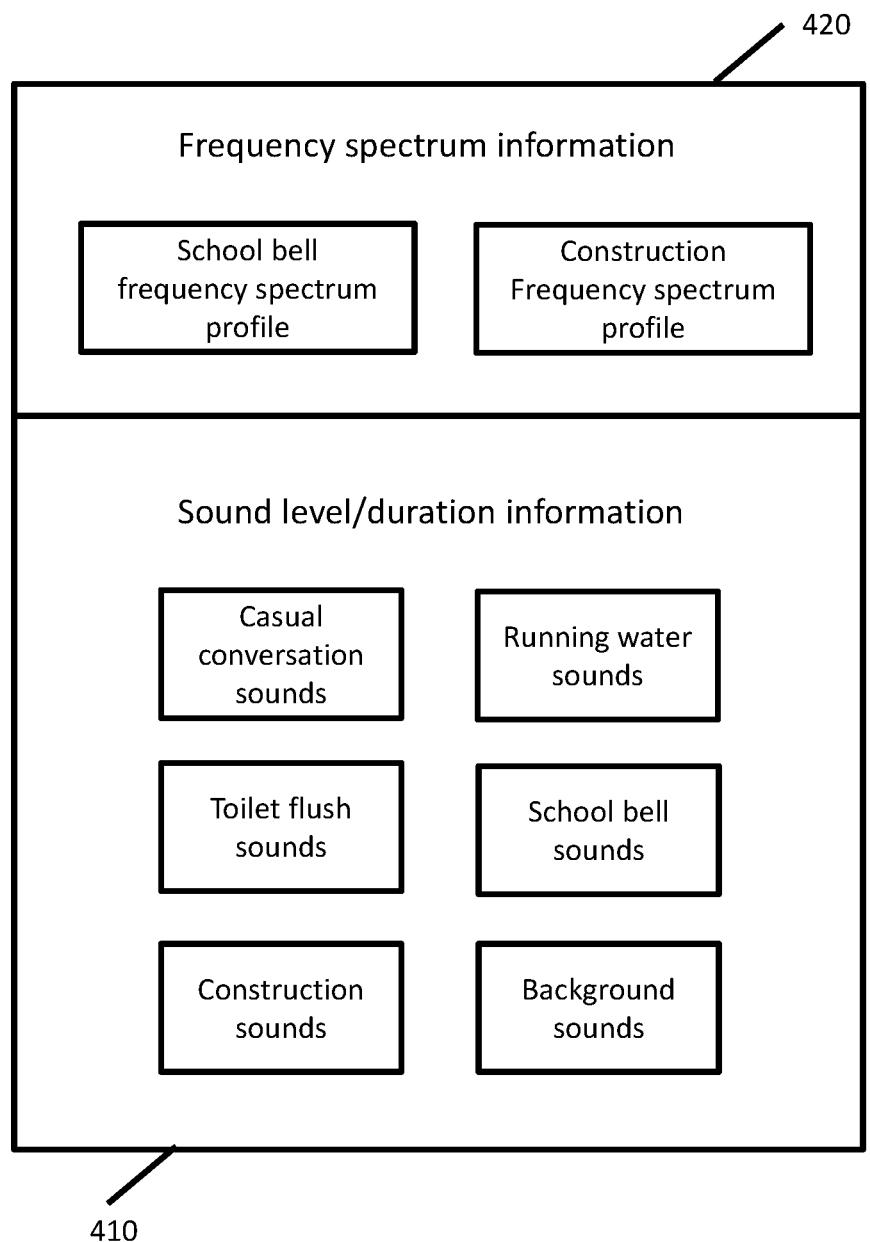
FIG. 4 is a block diagram of exemplary sound information and frequency spectrum information stored in a memory or storage, in accordance with aspects of the present disclosure.

FIG. 4 shows an exemplary memory or storage containing sound and duration information 410 for sounds from a learning mode and containing frequency spectrum information 420 for certain sounds from the learning mode. As an example, the sound and duration information 410 can be stored for casual conversation sounds, running water sounds, toilet flush sounds, school bell sounds, construction sounds, and background sounds. In various aspects, the memory or storage of FIG. 4 can be the database 130 of FIG. 1. In various aspects, the memory or storage of FIG. 4 can be located in another system or component, such as in the controller server 120 or in the detection sensors 110 of FIG. 1.

In accordance with aspects of the present disclosure, a sound level threshold and/or a time period threshold can be configured to exclude certain sounds from the learning mode from qualifying as a noise event. As described above, in various aspects, a sound may qualify as a noise event if a certain number or percentage of sound samples exceed the sound level threshold over a time period that exceeds a time level threshold. As an example, casual conversation or running water generally have low sound levels, and a sound level threshold can be set to a level that does not permit casual conversation or running water to qualify as a noise event. A toilet flush may exceed such a sound level threshold but generally has a short duration. Therefore, a time period threshold can be set to a longer duration that does not permit a toilet flush to qualify as a noise event, even when the toilet flush sounds exceed a sound level threshold. In various aspects, a sound level threshold and a time period threshold can be stored in the memory/storage of FIG. 4, which can be in the detection sensor 110, in the control server 120, and/or in the database 130 of FIG. 1.

With continuing reference to FIG. 4, certain sounds may be too loud and/or too long to be excluded from being a noise event based on a sound level threshold and/or a time period threshold, including non-bullying sounds such as school bell sounds or construction sounds. In accordance with aspects of the present disclosure, such sounds can be analyzed based on their frequency spectrum information to determine whether the sounds indicate a potential bullying occurrence. In particular, the frequency spectrum profile for human voices is generally different from the frequency spectrum profile for machine sounds. For example, human voices are more dominant between 100 Hz and 10 kHz, and frequency content outside this range is fairly low. Additionally, human voices from a crowd would exhibit a convex or triangular shape over the 100 Hz to 10 kHz frequency range or over another frequency range audible to humans. In contrast, a machine or mechanical sound can have a more uniform profile over its frequency spectrum. Accordingly, the frequency spectrum information for a sound can be used to distinguish whether a noise event may correspond to human voices (and thus a potential bullying occurrence), or whether a noise event may correspond to machine sounds. The frequency spectrum profile 420 for various sounds can be stored, including frequency spectrum profile for casual conversation, non-bullying conversation, bullying sounds, altercation sounds, running water, toilet flush, background sounds, and/or any other sounds that may be helpful in determining whether or not a noise event is a potential bullying occurrence or a potential altercation occurrence.

Persons skilled in the art will recognize techniques for generating frequency spectrum information of sound samples, such as Fast Fourier Transformation and other Fourier Transform techniques. Configuration and implement of such techniques to provide frequency spectrum information for a sound in a computationally feasible manner will be understood by persons skilled in the art. The frequency spectrum information 420 can be stored in the memory/storage of FIG. 4.

The illustration of FIG. 4 is exemplary, and variations are contemplated to be within the scope of the present disclosure. For example, the sounds that can be stored are exemplary, and other sounds can be acquired in learning mode and can be stored. Additionally, frequency spectrum information can be generated and stored for more sounds than those shown in FIG. 4. In various aspects, sounds reflective of bullying can be acquired in learning mode and can be stored (not shown), and the frequency spectrum profile of the bullying sounds can be analyzed. In various aspects, the sounds stored in FIG. 4 may be sounds acquired by another source and may not be acquired by a detection sensor in learning mode. Other variations are contemplated to be within the scope of the present disclosure.

Figure 5:
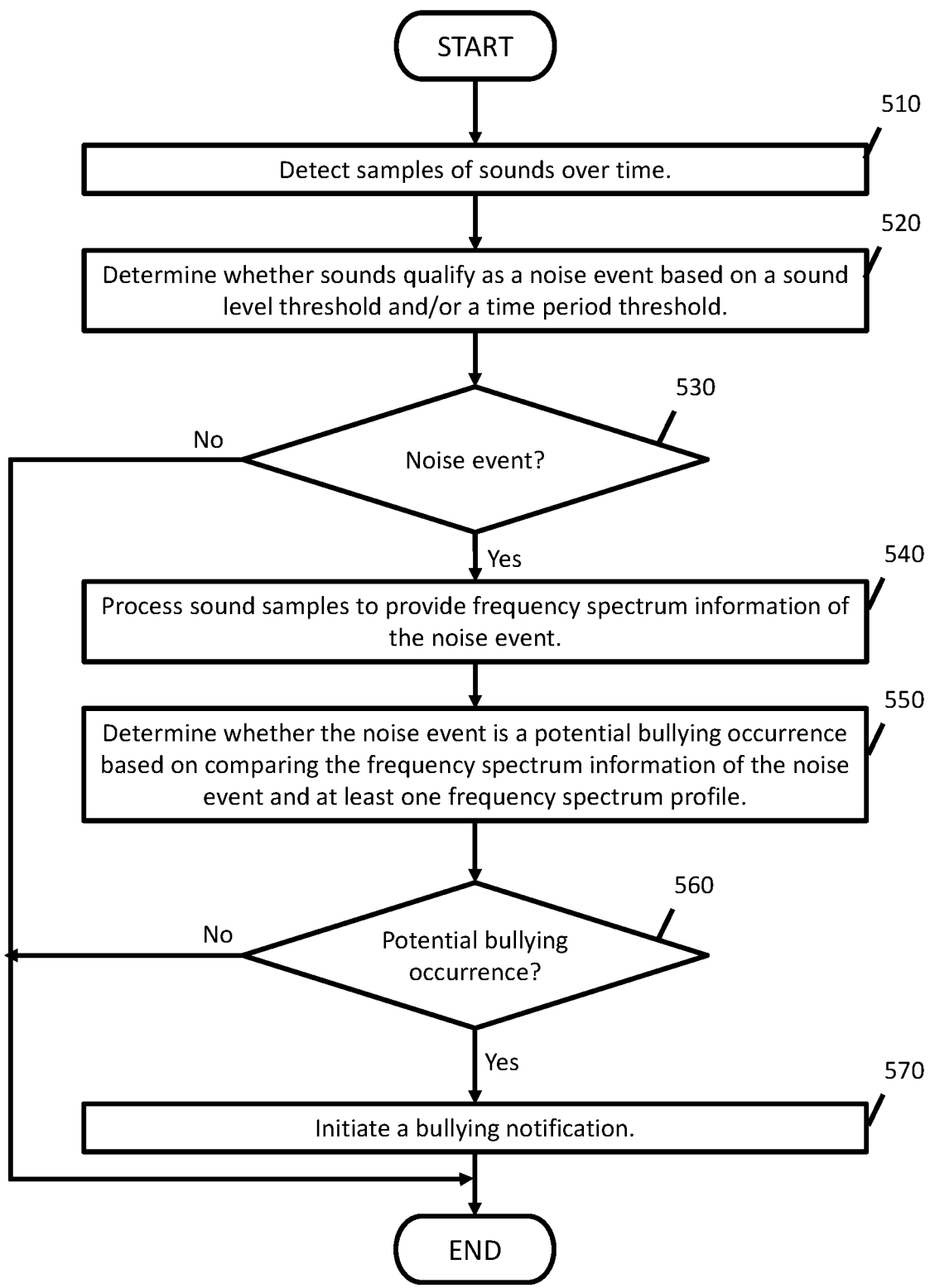
FIG. 5 is a flow diagram of an exemplary operation for processing sound samples, in accordance with aspects of the present disclosure.

FIG. 5 shows a flow diagram of an exemplary operation for processing sound samples. At block 510, the operation detects samples of sounds over time. The samples can be provided by a sound detection sensor that is sensitive to sounds over a frequency spectrum, such as 100 Hz to 10 kHz. At block 520, the operation determines whether the sounds qualify as a noise event based on a sound level threshold and/or a time period threshold. As described above, a noise event can be based on a particular number or a particular percentage of sound samples exceeding the sound level threshold for a time period that exceeds the time period threshold. If the sound levels do not qualify as a noise event (530), the operation ends.

If the sounds do qualify as a noise event (530), the operation proceeds to block 540 to process the sound samples to provide frequency spectrum information of the noise event. As described above, techniques for computing frequency spectrum information include Fast Fourier Transform ("FFT"). At block 550, the operation determines whether the noise event is a potential bullying occurrence based on comparing the frequency spectrum information of the noise event and at least one frequency spectrum profile. The frequency spectrum profiles can include, for example, frequency dominance between 100 Hz and 10 kHz, a convex or triangular frequency profile between 100 Hz and 10 kHz, a convex or triangular frequency profile in another frequency range audible to humans, and/or a substantially uniform frequency profile over the frequency spectrum of the noise event, among others. In various aspects, comparing the frequency spectrum information to a frequency spectrum profile includes smoothing the FFT signal of the frequency spectrum information and calculating incremental changes between FFT bins. The incremental changes can be analyzed for various patterns and/or distributions. For example, if the FFT signal has a convex or triangular shape, a first group of the incremental changes between FFT bins should be dominated by positive numbers while a second group of the incremental changes between FFT bins should be dominated with negative numbers. In various aspects, one or more thresholds or criteria can be used to determine whether or not the patterns and/or distributions are indicative of triangular shape, which is generally associated with human voice, or a uniform profile, which is generally associated with machine noise. The one or more thresholds or criteria can include, for example, number of incremental changes between FFT bins or percentage of incremental changes between FFT bins having positive or negative values. In various aspects, the frequency spectrum profiles can include frequency spectrums of sounds acquired in a learning mode and/or frequency spectrums of sounds acquired by another source. If the comparison determines that the noise event is not a potential bullying occurrence (560), the operation ends. If the comparison determines that the noise event is a potential bullying occurrence (560), the operation initiates a bullying notification at block 570. The bullying notification can inform a person that potential bullying occurring and the location of the detection sensor which acquired the sound levels.

The operation of FIG. 5 is exemplary, and variations are contemplated to be within the scope of the present disclosure. For example, in various aspects, blocks 520 and 550 can be combined such that potential bullying can be identified based on a sound level threshold, a time period threshold, and frequency profile information, and intermediate block 530 can be removed. As another example, the operation of FIG. 5 can be applied and/or tailored to detecting a potential altercation rather than potential bullying. Other variations are contemplated to be within the scope of the present disclosure.

As explained above, frequency spectrum information of a sound can be compared with frequency spectrum profiles to determine whether the sound predominantly includes human voices or machine noises. In accordance with aspects of the present disclosure, the capability to distinguish between human voices and machine noise can be used to measure noise comfort level in various applications, such as in an office, in a hospital room, and/or in public areas where excessive machine noise may be undesirable. In various aspects, one or more thresholds or criteria can be used to determine whether machine noise is excessive. For example, if a particular number of noise events or a particular percentage of noise events are identified as machine noise rather than human voices, such threshold and/or criteria can be used to determine that machine noise is excessive. Other thresholds and/or criteria are contemplated to be within the scope of the present disclosure. Also, such aspects of the present disclosure can be applied to various settings other than an office or hospital room, and such other applications are contemplated to be within the scope of the present disclosure.

Figure 6:
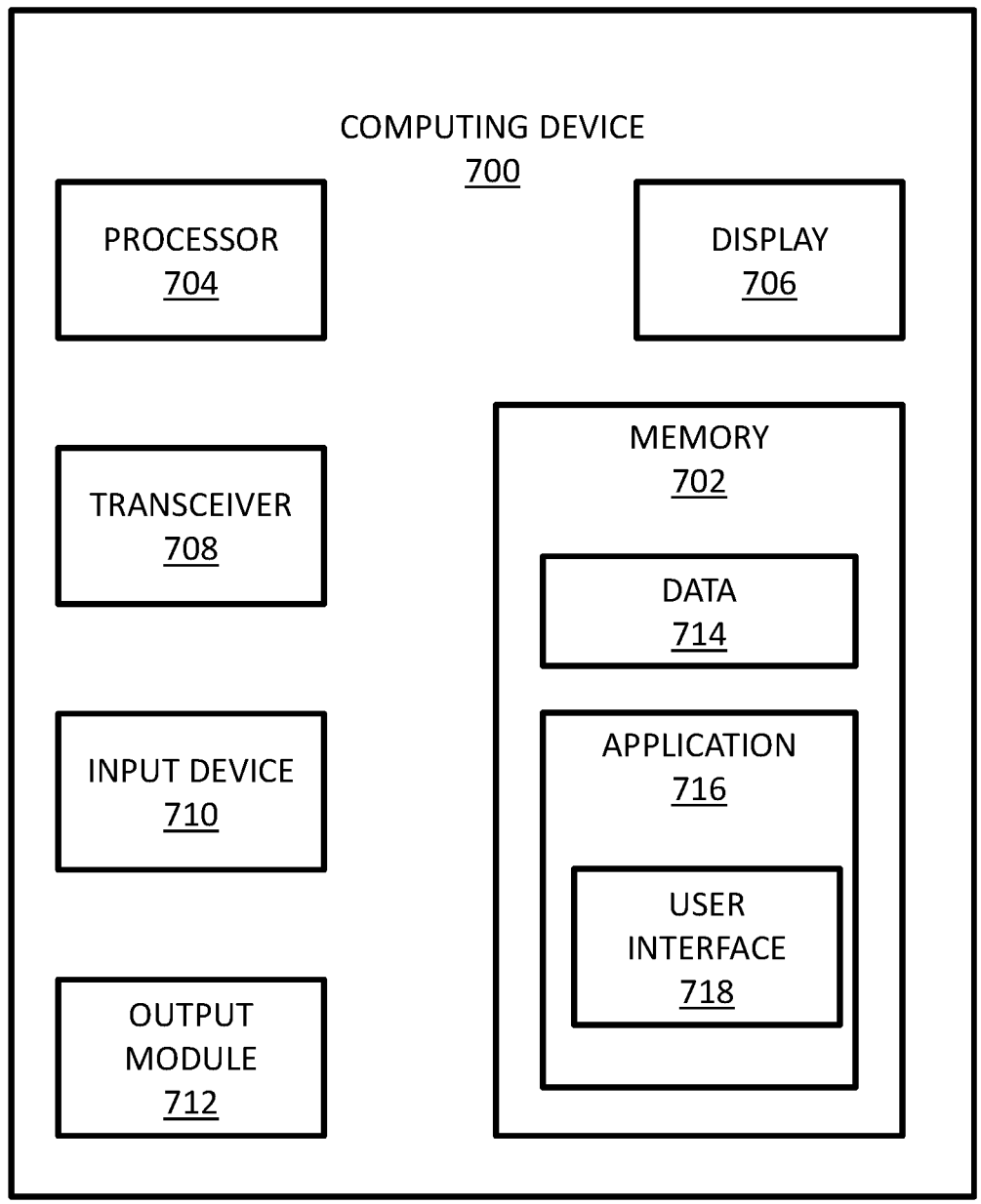
FIG. 6 is a block diagram of exemplary components of a computing device, in accordance with aspects of the present disclosure.

Turning now to FIG. 6, a block diagram is provided for an exemplary computing device 700, which can be the control server 120, the database 130, the message server 140, and/or the client server 160 of FIG. 1. The computing device 700 includes a memory 702, a processor 704, a display 706, a network interface 708, an input device 710, and/or an output module 712. The memory 702 includes any non-transitory computer-readable storage media for storing data and/or software that is executable by the processor 704 and which controls the operation of the computing device 700, such as the operations shown in FIG. 5 or described in the present disclosure.

In an aspect, the memory 702 may include one or more solid-state storage devices such as flash memory chips. Alternatively, or in addition to the one or more solid-state storage devices, the memory 702 may include one or more mass storage devices connected to the processor 704 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 704. That is, computer readable storage media may include non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by the computing device 700.

The memory 702 may store application 716 and/or data 714 (e.g., sound samples, frequency spectrum information). The application 716 may, when executed by processor 704, cause the display 706 to present the user interface 718. The processor 704 may be a general-purpose processor, a specialized graphics processing unit (GPU) configured to perform specific graphics processing tasks while freeing up the general-purpose processor to perform other tasks, and/or any number or combination of such processors. The display 706 may be touch-sensitive and/or voice-activated, enabling the display 706 to serve as both an input and output device. Alternatively, a keyboard (not shown), mouse (not shown), or other data input devices may be employed. The network interface 708 may be configured to connect to a network such as a local area network (LAN) consisting of a wired network and/or a wireless network, a wide area network (WAN), a wireless mobile network, a Bluetooth network, and/or the internet.

For example, the computing device 700 may receive, through the network interface 708, detection results for the detection sensor 110 of FIG. 1, such as detected sound samples. The computing device 700 may receive updates to its software, such as the application 716, via the network interface 708. The computing device 700 may also display notifications on the display 706 that a software update is available.

The input device 710 may be any device by which a user may interact with the computing device 700, such as, for example, a mouse, keyboard, foot pedal, touch screen, and/or voice interface. The output module 712 may include any connectivity port or bus, such as, for example, parallel ports, serial ports, universal serial busses (USB), or any other similar connectivity port known to those skilled in the art. The application 716 may be one or more software programs stored in the memory 702 and executed by the processor 704 of the computing device 700. The application 716 may be installed directly on the computing device 700 or via the network interface 708. The application 716 may run natively on the computing device 700, as a web-based application, or any other format known to those skilled in the art.

In an aspect, the application 716 can be a software program having various of the features and functionality described in the present disclosure. In other aspects, the application 716 may be two or more distinct software programs providing various parts of the features and functionality described herein. Various software programs forming part of the application 716 may be enabled to communicate with each other and/or import and export various settings and parameters relating to the identification of bullying. The application 716 communicates with a user interface 718 which generates a user interface for presenting visual interactive features to the notification subscribers 150 or the client devices 170 of FIG. 1 on the display 706. For example, the user interface 718 may generate a graphical user interface (GUI) and output the GUI to the display 706.

The illustrated aspect of FIG. 6 is exemplary, and variations are contemplated to be within the scope of the present disclosure. Various aspects may include fewer components than shown in FIG. 6, and various aspects may include other components not shown in FIG. 6. Such variations are contemplated to be within the scope of the present disclosure.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, FORTRAN, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for identifying potential bullying comprising:
a sound detector configured to detect samples of sounds over time and provide digital samples;
a server configured to send a command to the sound detector to adjust internal parameters of the sound detector for detecting a potential bullying, the server comprising:
a processor; and
a memory storing instructions which, when executed by the processor, cause the server to:
determine that a noise event has occurred by processing the digital samples to determine that the sounds exceed a sound level threshold over a time period that exceeds a time period threshold,
convert the digital samples from a time domain to a frequency domain to provide frequency spectrum information of the noise event,
determine whether the noise event is a potential bullying occurrence based on comparing the frequency spectrum information of the noise event and at least one frequency spectrum profile, and
initiate a bullying notification in a case of determining that the noise event is a potential bullying occurrence,
wherein the at least one frequency spectrum profile includes a triangular shape over a range between 100 Hz and 10 kHz.

2. The system according to claim 1, wherein the instructions, when executed by the processor, further cause the system to:
determine at least one of the sound level threshold or the time period threshold based on the digital samples of sounds from a learning mode, wherein the digital samples are detected and provided in the learning mode in absence of any bullying occurrence.

3. The system according to claim 2, wherein the digital samples of sounds in the learning mode reflect non-bullying conversation, and
wherein the instructions, when executed by the processor, further cause the system to set at least one of the sound level threshold or the time period threshold so as to exclude the non-bullying conversation from the learning mode as a noise event.

4. The system according to claim 2, wherein the digital samples of sounds in the learning mode reflect non-bullying sounds, and
wherein the instructions, when executed by the processor, further cause the system to set at least one of the sound level threshold or the time period threshold so as to exclude at least one of the non-bullying sounds from the learning mode as a noise event.

5. The system according to claim 4, wherein the sound level threshold and the time period threshold qualify at least one other of the non-bullying sounds from the learning mode as a noise event.

6. The system according to claim 5, wherein in determining whether the noise event is a potential bullying occurrence, the instructions, when executed by the processor, cause the system to determine whether the noise event is a potential bullying occurrence based on comparing the frequency spectrum information of the at least one other of the non-bullying sounds and the at least one frequency spectrum profile.

7. The system according to claim 1, wherein in determining that the noise event is a potential bullying occurrence, the instructions, when executed by the processor, cause the system to determine that the frequency spectrum information of the noise event includes frequency dominance between 100 Hz and 10 kHz.

8. The system according to claim 1, wherein in comparing the frequency spectrum information of the noise event and the at least one frequency spectrum profile, the instructions, when executed by the processor, cause the system to compare the frequency spectrum information of the noise event to a frequency spectrum profile having a substantially uniform frequency profile.

9. The system according to claim 8, wherein the instructions, when executed by the processor, further cause the system to not initiate a bullying notification in a case of determining that the frequency spectrum information of the noise event matches the substantially uniform frequency profile.

10. A method for identifying potential bullying comprising:
detecting and digitizing samples of sounds over time by a sound detector;
sending, by a server, a command to the sound detector to adjust internal parameters of the sound detector for detecting a potential bullying;
determining, by the server, that a noise event has occurred by processing the digital samples to determine that the sounds exceed a sound level threshold over a time period that exceeds a time period threshold;
converting, by the server, the digital samples from a time domain to a frequency domain to provide frequency spectrum information of the noise event;
determining, by the server, whether the noise event is a potential bullying occurrence based on comparing the frequency spectrum information of the noise event and at least one frequency spectrum profile; and
initiating, by the server, a bullying notification in a case of determining that the noise event is a potential bullying occurrence,
wherein the at least one frequency spectrum profile includes a triangular shape over a range between 100 Hz and 10 kHz.

11. The method according to claim 10, further comprising:
determining, by the server, at least one of the sound level threshold or the time period threshold based on the digital samples of sounds from a learning mode,
wherein the digital samples are detected and provided in the learning mode in absence of any bullying occurrence.

12. The method according to claim 11, wherein the digital samples of sounds in the learning mode reflect non-bullying conversation, the method further comprising:
setting, by the server, at least one of the sound level threshold or the time period threshold so as to exclude the non-bullying conversation from the learning mode as a noise event.

13. The method according to claim 11, wherein the digital samples of sounds in the learning mode reflect non-bullying sounds, the method further comprising:
setting, by the server, at least one of the sound level threshold or the time period threshold so as to exclude at least one of the non-bullying sounds from the learning mode as a noise event.

14. The method according to claim 13, wherein the sound level threshold and the time period threshold qualify at least one other of the non-bullying sounds from the learning mode as a noise event.

15. The method according to claim 14, wherein determining whether the noise event is a potential bullying occurrence includes determining whether the noise event is a potential bullying occurrence based on comparing the frequency spectrum information of the at least one other of the non-bullying sounds and the at least one frequency spectrum profile.

16. The method according to claim 10, wherein determining that the noise event is a potential bullying occurrence includes determining that the frequency spectrum information of the noise event includes frequency dominance between 100 Hz and 10 kHz.

17. The method according to claim 10, wherein comparing the frequency spectrum information of the noise event and the at least one frequency spectrum profile includes comparing the frequency spectrum information of the noise event to a frequency spectrum profile having substantially uniform frequency profile.

18. The method according to claim 10, further comprising not initiating, by the server, a bullying notification in a case of determining that the frequency spectrum information of the noise event matches the substantially uniform frequency profile.

* * * * *